(12) United States Patent
Kobori

(10) Patent No.: US 9,010,716 B2
(45) Date of Patent: Apr. 21, 2015

(54) VIBRATION-DAMPING DEVICE

(75) Inventor: Tatsuya Kobori, Kawasaki (JP)

(73) Assignee: Bridgestone Corporation, Tokyo (JP)

( * ) Notice: Subject to any disclaimer, the term of this patent is extended or adjusted under 35 U.S.C. 154(b) by 176 days.

(21) Appl. No.: 13/576,822

(22) PCT Filed: Feb. 4, 2011

(86) PCT No.: PCT/JP2011/052418
§ 371 (c)(1),
(2), (4) Date: Aug. 2, 2012

(87) PCT Pub. No.: WO2011/096537
PCT Pub. Date: Aug. 11, 2011

(65) Prior Publication Data
US 2012/0298832 A1    Nov. 29, 2012

(30) Foreign Application Priority Data
Feb. 4, 2010    (JP) .................. 2010-023512

(51) Int. Cl.
*F16M 13/00*    (2006.01)
*F16F 3/087*    (2006.01)
(Continued)

(52) U.S. Cl.
CPC ............. *F16F 3/0876* (2013.01); *F16F 1/3732* (2013.01); *B60G 2204/41* (2013.01); *F16F 1/3713* (2013.01); *F16F 1/3735* (2013.01); *F16F 1/44* (2013.01)

(58) Field of Classification Search
CPC ......... F16F 7/00; F16F 1/3732; F16F 1/3863; F16F 1/3835; F16F 1/44; F16F 1/3735; F16F 3/0876; B60G 2204/41; B60G 2204/4102

USPC .......... 248/635, 560, 562, 634, 636; 267/136, 267/140.11, 141, 141.1, 141.4, 293
See application file for complete search history.

(56) References Cited

U.S. PATENT DOCUMENTS 4,213,718 A * 7/1980 Lumby ........................ 403/197
4,252,339 A * 2/1981 Shimizu et al. ........ 280/124.108
(Continued)

FOREIGN PATENT DOCUMENTS

CN    1654846 A    8/2005
JP    08-320042 A    12/1996
(Continued)

OTHER PUBLICATIONS

International Search Report of PCT/JP2011/052418 dated May 17, 2011.
(Continued)

*Primary Examiner* — Anita M King
(74) *Attorney, Agent, or Firm* — Sughrue Mion, PLLC (57) ABSTRACT

This vibration-damping device (1) includes: a bracket member (3) connected to one of a vibration-generator and a vibration-receiver; and a vibration-damping member (2A, 2B) including: a cylindrical first mounting member (20A, 20B) fitted inside a fitting part (30) provided in the bracket member (3), a second mounting member (21A, 21B) connected to the other of the vibration generator and the vibration receiver, and an elastic body (22A, 22B) that elastically connects the first mounting member (20A, 20B) and the second mounting member (21A, 21B). The first mounting member (20A, 20B) and the fitting part (30) are each formed in a shape having a plurality of radii of different lengths in a plan view.

2 Claims, 6 Drawing Sheets

(51) Int. Cl.
  *F16F 1/373* (2006.01)
  *F16F 1/371* (2006.01)
  *F16F 1/44* (2006.01)

(56) References Cited

U.S. PATENT DOCUMENTS

| | | | | |
|---|---|---|---|---|
| 4,530,491 | A | * | 7/1985 | Bucksbee et al. ............ 267/141 |
| 5,456,454 | A | * | 10/1995 | Schulz et al. ................ 267/293 |
| 5,842,677 | A | * | 12/1998 | Sweeney et al. ............. 248/635 |
| 6,354,578 | B1 | * | 3/2002 | Nakatsukasa et al. ........ 267/258 |
| 6,820,908 | B1 | * | 11/2004 | Tousi et al. .................. 296/35.1 |
| 7,735,812 | B2 | * | 6/2010 | Fitzgerald ..................... 267/293 |
| 8,360,405 | B2 | * | 1/2013 | Stillabower ................ 267/141.4 |
| 8,523,154 | B2 | * | 9/2013 | Fujiwara ....................... 267/293 |
| 2002/0140146 | A1 | | 10/2002 | Nakagawa |
| 2006/0202400 | A1 | * | 9/2006 | Fitzgerald ..................... 267/293 |
| 2008/0169591 | A1 | | 7/2008 | Kobayashi et al. |
| 2010/0133734 | A1 | | 6/2010 | Fujiwara |
| 2010/0327502 | A1 | * | 12/2010 | Nakamura .................... 267/141 |

FOREIGN PATENT DOCUMENTS

| | | |
|---|---|---|
| JP | 09-303459 A | 11/1997 |
| JP | 11-182598 A | 7/1999 |
| JP | 11-182600 A | 7/1999 |
| JP | 2001-090779 A | 4/2001 |
| JP | 2002-295560 A | 10/2002 |
| JP | 2004-84921 A | 3/2004 |
| JP | 2005-024051 A | 1/2005 |
| JP | 2006-207705 A | 8/2006 |
| JP | 2006-300106 A | 11/2006 |
| JP | 2006-300107 A | 11/2006 |
| JP | 2008-169924 A | 7/2008 |
| JP | 2008-255999 A | 10/2008 |
| WO | 2008/120728 A1 | 10/2008 |

OTHER PUBLICATIONS

Chinese Office Action, dated Dec. 25, 2013, issued in Chinese Patent Application No. 201180016236.9.

* cited by examiner

FIG. 7

VIBRATION-DAMPING DEVICE

TECHNICAL FIELD

The present invention relates to a vibration-damping device used as a cabin mount, an engine mount, or the like in an agricultural machine or a construction machine.

The present application is a National Stage of International Application No. PCT/JP2011/052418 filed Feb. 4, 2011, claiming priority on Japanese Patent Application No. 2010-023512, filed on Feb. 4, 2010, the contents of which are incorporated herein by reference.

BACKGROUND ART

A conventionally known vibration-damping device, such as, for example, that shown in Patent Document 1 (Paragraph Nos. [0020] to [0037] and FIGS. 1 to 8), includes a supporting member (bracket member) connected to one of a vibration-generator and a vibration-receiver, and a vibration-damping rubber (vibration-damping member) held in the supporting member. The vibration-damping rubber includes an outer cylinder (first mounting member) fitted inside a fitting hole (fitting part) provided in the supporting member, an inner cylinder (second mounting member) disposed inside the outer cylinder and connected to the other of the vibration-generator and the vibration-receiver, and a rubber part (elastic body) that connects the outer and inner cylinders.

The fitting hole and the outer cylinder are each formed in a true-circular shape in a plan view, and the outer cylinder is pressed inside the fitting hole.

Another conventionally known vibration-damping device, such as, for example, that shown in Patent Document 2, is a sandwich-type vibration-damping device including a pair of vibration-damping members disposed such that the end parts of the outer cylinders (first mounting members) in the axial direction face each other, and plate members (sandwiching members) that sandwich the pair of vibration-damping members from both sides in the axial direction. In this vibration-damping device, the outer cylinders of the pair of vibration-damping members are formed in cylindrical shapes, and are fitted inside a mounting hole (fitting part) that is formed in the bracket member and is circular in a plan view, from both sides thereof in the axial direction. Flange parts are formed at the ends of the outer cylinders on the axial direction outer sides (sides of both sandwiching members), and protrude radially outward. These flange parts sandwich the bracket member.

DOCUMENT OF RELATED ART

Patent Document

[Patent Document 1] Japanese Patent Application, First Publication No. 2006-207705
[Patent Document 2] Japanese Patent Application, First Publication No. 2008-255999

SUMMARY OF INVENTION

Technical Problem

However, in the conventional vibration-damping devices described above, when attaching the vibration-damping member to the bracket member, the vibration-damping member and the bracket member need to be positioned relatively in the circumferential direction so that the vibration-damping member is disposed at a desired position in the circumferential direction, and this positioning operation is therefore complex. Also, since it is necessary to check whether they are positioned reliably, the assembly operation is time-consuming and productivity is poor.

The present invention has been realized in consideration of the conventional problems described above, and aims to provide a vibration-damping device that can make it easy to reliably position the vibration-damping member and the bracket member relatively in the circumferential direction, and can increase productivity.

Solution to Problem

A vibration-damping device according to a first aspect of the present invention includes: a bracket member connected to one of a vibration-generator and a vibration-receiver; and a vibration-damping member including: a cylindrical first mounting member fitted inside a fitting part provided in the bracket member and connected to the one of the vibration-generator and the vibration-receiver via the bracket member, a second mounting member connected to the other of the vibration generator and the vibration receiver, and an elastic body that elastically connects the first mounting member and the second mounting member. The first mounting member and the fitting part are each formed in a shape having a plurality of radii of different lengths in a plan view.

According to the first aspect of the present invention, the first mounting member and the fitting part are each formed in a shape having a plurality of radii of different lengths, i.e. they are each formed in a non-true-circular shape in a plan view. Therefore, when attaching the vibration-damping member to the bracket member, the vibration-damping member and the bracket member are automatically positioned relatively in the circumferential direction by fitting the first mounting member inside the fitting part of the bracket member.

In the conventional sandwich-type vibration-damping device mentioned above, a pin-shaped positioning part for positioning the bracket member and the pair of vibration-damping members in the circumferential direction is provided on the flange part of the outer cylinder (first mounting member). Also, a through-hole is formed in the bracket member, and the positioning part is fitted into this through-hole. When the positioning part is fitted into the through-hole of the bracket member, the bracket member and the pair of vibration-damping members are positioned relatively in the circumferential direction. However, in such a vibration-damping device, the positioning part has to be fitted into the through-hole at the time of assembly. Since there is a possibility that the positioning part will not fit into the through-hole at the time of assembly, it is necessary to check whether the positioning part has been fitted into the through-hole. Consequently, the assembly process is complex and time-consuming, resulting in poor productivity.

In view of the problems mentioned above, the present invention may be applied in a sandwich-type vibration-damping device.

That is, in a vibration-damping device according to a second aspect of the present invention, a pair of vibration-damping members may be disposed such that end faces of first mounting members in an axial direction thereof face each other, and second mounting members may be formed in cylindrical shapes. A pair of sandwiching members may be provided to sandwich the pair of vibration-damping members from both sides in an axial direction thereof, and a fastening member may be provided to be inserted inside the second mounting members and to connect the pair of sandwiching members. Each first mounting member of the pair of vibration-damping members may include a flange part that protrudes radially outward, and the bracket member may be disposed between a pair of flange parts. By fastening the fastening member and thereby pressing the pair of sandwiching members in a direction closer to each other, the bracket member may be sandwiched between the pair of flange parts and the pair of vibration-damping members may be held in the bracket member, and elastic bodies may be compressed beforehand by the pair of sandwiching members.

In that case, when attaching the pair of vibration-damping members to the bracket member, by fitting each of the first mounting members of the pair of vibration-damping members inside the fitting part of the bracket member, the pair of vibration-damping members and the bracket member are automatically positioned relatively in the circumferential direction. This makes it possible to omit the conventional positioning part in the sandwich-type vibration-damping device mentioned above.

If a cut-off part is formed in the elastic body, the rigidity of the vibration-damping member decreases in the direction where the cut-off part is disposed. Thus, by forming the cut-off part in the elastic body, it is possible to reduce the rigidity of the vibration-damping member only in the direction of the vibration transmitted from the vibration-generator. If the rigidity is reduced, the vibration-damping performance of the vibration-damping member is enhanced. Also, since the cut-off part is formed only in one part of the elastic body, the supporting rigidity of the vibration-damping member with respect to the vibration-generator or the vibration-receiver decreases by only a small amount. Therefore, the vibration-damping performance can be enhanced while ensuring the supporting rigidity.

For example, when the first mounting member is connected via the bracket member to the vehicle body (vibration-receiver), and the second mounting member is connected via the sandwiching member to the engine (vibration-generator), the vibration from the engine acting on the vibration-damping device becomes rolling vibration around the driveshaft of the engine. By positioning the vibration-damping member in the circumferential direction such that the cut-off part is disposed in the rolling direction (left-right direction) in a plan view, it is possible to maintain the rigidity in the up-down and front-rear directions, reduce the rigidity in the left-right direction, and thus enhance the vibration-damping performance while ensuring the supporting rigidity.

However, if the cut-off part mentioned above is formed in the elastic body, the spring constant of the elastic body in the left-right direction (the direction that the cut-off part is disposed in) decreases. As a consequence, the second mounting member becomes likely to suffer considerable displacement in the left-right direction relative to the first mounting member, reducing the durability of the elastic body.

In view of the problems mentioned above, in a vibration-damping device according to a third aspect of the present invention, a cut-off part may be formed in the elastic body, and be disposed at a position in a short-diameter direction with the shortest radius in radial directions of the first mounting member.

In this case, the spring constant of the elastic body having the cut-off part in the cut-off part direction (the direction that the cut-off part is disposed in) in the radial directions decreases, and thus the amount of deformation in the cut-off part direction increases. Since the cut-off part is disposed at a position in the short-diameter direction with the shortest radius in the radial directions of the first mounting member, there is a small gap between the inner peripheral face of the first mounting member and the outer peripheral face of the second mounting member in the cut-off part direction. This limits the deformation of the elastic body in the cut-off part direction, and reduces the maximum displacement of the elastic body in the cut-off part direction. Therefore, decline in the durability can be suppressed, and the life of the vibration-damping device can be increased.

Effects of Invention

According to the vibration-damping device in the first aspect of the present invention, by fitting the first mounting member inside the fitting part of the bracket member, the vibration-damping member and the bracket member are automatically positioned relatively in the circumferential direction, thus making it easy to reliably position them relatively in the circumferential direction. Therefore, the productivity of the vibration-damping device can be increased.

DESCRIPTION OF EMBODIMENTS

First Embodiment

A vibration-damping device according to a first embodiment of the present invention will be described based on the drawings.

Figure 1:
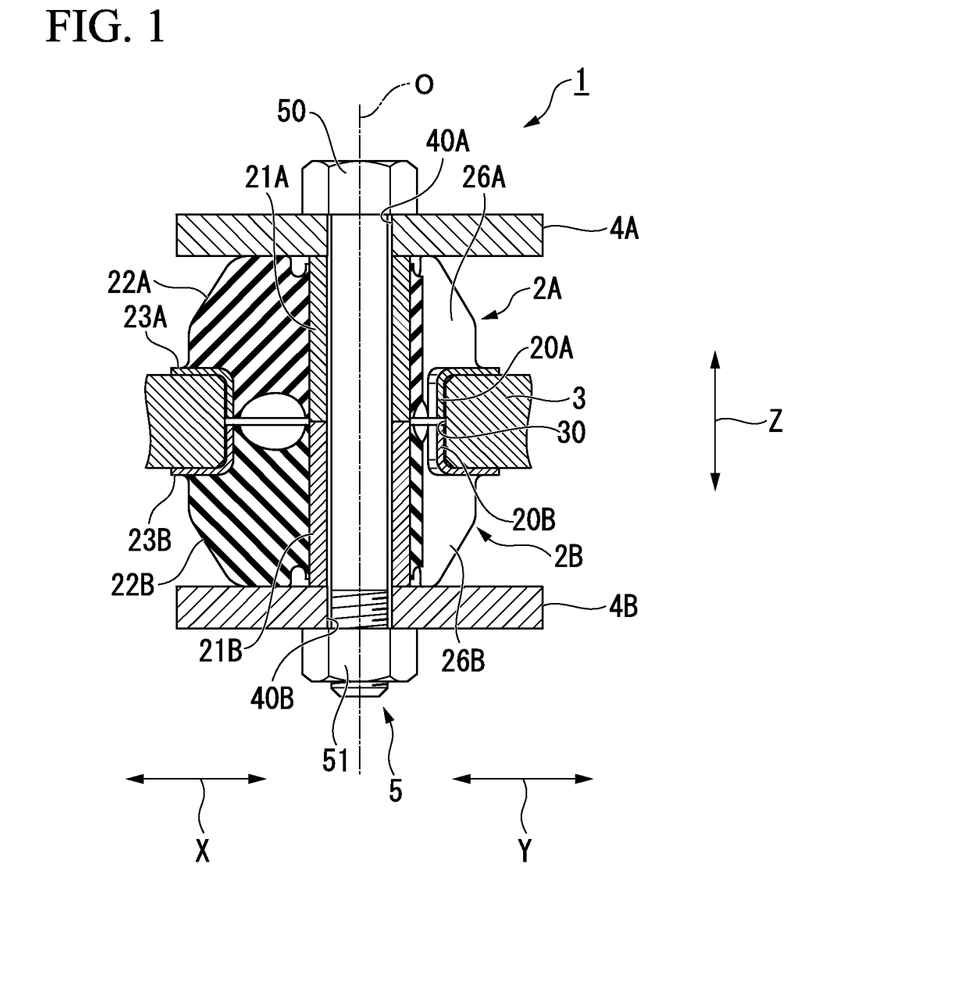
FIG. 1 is a vertical cross-sectional view of a vibration-damping device for explanation of a first embodiment of the present invention.

Symbol O in FIG. 1 represents the central axis of a vibration-damping device 1. The direction along the axis O is termed 'axial direction', the direction orthogonal to the axis O is termed 'radial direction', and the direction around the axis O is termed 'circumferential direction.' The direction of symbol X in FIG. 2A (the horizontal direction in FIG. 2A) represents the front-rear direction, the direction of symbol Y in FIG. 2A (the vertical direction in FIG. 2A) represents the left-right direction, and the direction of symbol Z in FIG. 1 (the vertical direction in FIG. 1) represents the up-down direction. Hereinafter, a view from the up-down direction will sometimes be termed a 'plan view.' When viewed from one vibration-damping member 2A (2B) described below, the opposite face side (the bottom side in FIG. 2B) to another vibration-damping member 2B (2A) is termed the axial direction inner side, and the reverse side thereto (the top side in FIG. 2B) is termed the axial direction outer side.

Figure 2A:
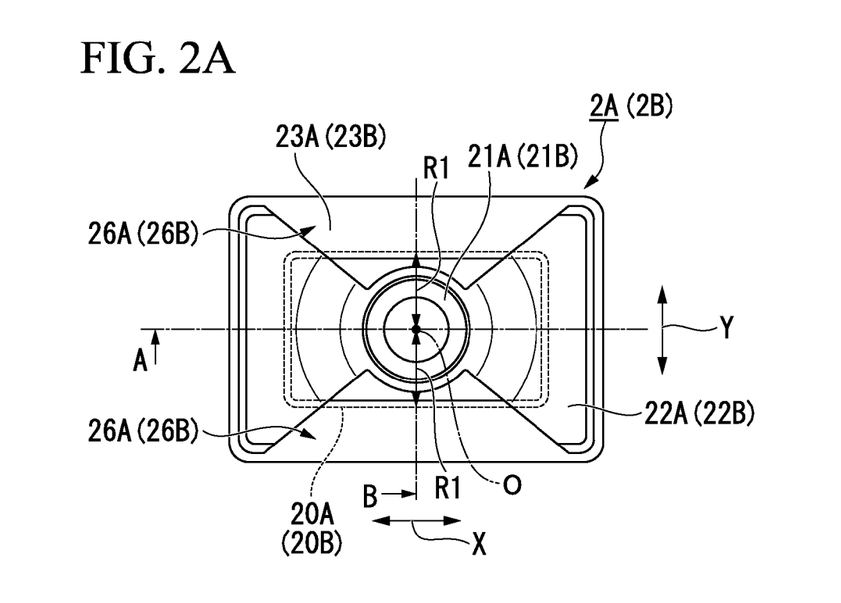
FIG. 2A is a plan view of a vibration-damping member for explanation of the first embodiment of the present invention.

The portion on the left side of the axis O of FIG. 1 is that viewed in the direction of arrow A in FIG. 2A, and the portion on the right side of the axis O in FIG. 1 is that viewed in the direction of arrow B in FIG. 2A.

As shown in FIG. 1, the vibration-damping device 1 is applied as, for example, an engine mount. The vibration-damping device 1 absorbs and damps vibration input from an unillustrated engine (corresponding to a vibration-generator of the present invention) mounted on a construction machine or the like, and prevents transmission of the vibration to an unillustrated vehicle body (corresponding to a vibration-receiver of the present invention). Much of the vibration of the engine is rolling vibration rotating around the driveshaft thereof, and the vibration-damping device 1 absorbs and damps this rolling vibration.

The driveshaft of the engine extends in the front-rear direction, and the engine vibrates mainly in the left-right direction in a plan view.

The vibration-damping device 1 is a so-called sandwich-type vibration-damping device, in which a pair of vibration-damping members 2A and 2B having the same shape are arranged symmetrically with respect to the perpendicular plane to the axis O as the plane of symmetry. The vibration-damping device 1 includes a bracket member 3 connected to the vehicle body, the pair of vibration-damping members 2A and 2B attached to the bracket member 3, a pair of sandwiching members 4A and 4B that sandwich the pair of vibration-damping members 2A and 2B from both sides in the axial direction, and a fastening member 5 that connects the pair of sandwiching members 4A and 4B.

The pair of vibration-damping members 2A and 2B are disposed on the same axis such that the end faces of the axial direction inner sides of outer cylinders 20A and 20B (described below, and corresponding to first mounting members in this invention) face each other. The fastening member 5 is passed inside inner cylinders 21A and 21B (described below, and corresponding to second mounting members of this invention).

Subsequently, the configuration of the vibration-damping member 2A (2B) will be described.

Figure 2B:
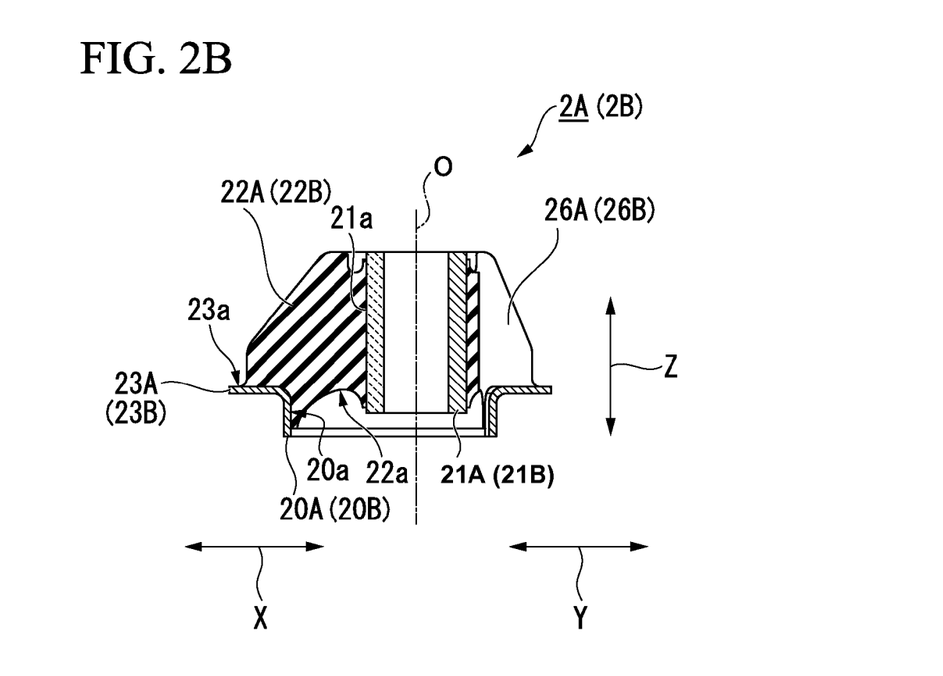
FIG. 2B is a vertical cross-sectional view of the vibration-damping member for explanation of the first embodiment of the present invention.

As shown in FIGS. 1, 2A, and 2B, the vibration-damping member 2A (2B) broadly includes an outer cylinder 20A (20B) connected to the vehicle body via the bracket member 3, an inner cylinder 21A (21B) connected to the engine via one sandwiching member 4A (4B) in the pair of sandwiching members 4A and 4B, and an elastic body 22A (22B) that elastically connects the outer cylinder 20A (20B) and the inner cylinder 21A (21B).

The outer cylinder 20A (20B) is a cylindrical body extending in the axial direction with the axis O as its central axis, and is formed in a non-true-circular shape in a plan view having a plurality of radii of different lengths in a horizontal cross-sectional view. The 'radii' mentioned above are the linear distances from the central axis (axis O) of the outer cylinder 20A (20B) to the outer peripheral face of the outer cylinder 20A (20B) in a plan view. That is, the outer cylinder 20A (20B) is formed in a shape wherein the distance from the outer peripheral face to the axis O has a plurality of different lengths. The outer cylinder 20A (20B) is a cylindrical body having the shape of a rectangular cylinder extending in the axial direction, and is formed in an elongated shape in a cross-sectional view, being long in the front-rear direction (X direction) and short in the left-right direction (Y direction). That is, the smallest radius of the outer cylinder 20A (20B) is a radius R1 extending in the left-right direction (Y direction). The shape of the outer cylinder 20A (20B) in a plan view has point symmetry with the axis O as the center. A flange part 23A (23B) is provided at the end of the outer cylinder 20A (20B) on the axial direction outer side (the sandwiching member 4A (4B) side), and protrudes radially outward. The flange part 23A (23B) is a rectangular ring part disposed along the whole periphery of the outer cylinder 20A (20B).

The inner cylinder 21A (21B) is a cylindrical body having a round-cylinder shape that is disposed inside the outer cylinder 20A (20B) in a plan view, and is coaxial with the outer cylinder 20A (20B) with the axis O as a common axis. Thus, the outer cylinder 20A (20B) is formed in a shape in which the distance from the outer peripheral face thereof to the inner cylinder 21A (21B) has a plurality of different lengths. The entire length (the entire length in the up-down direction (Z direction)) of the inner cylinder 21A (21B) is greater than that of the outer cylinder 20A (20B), and the inner cylinder 21A (21B) is disposed such as to protrude further to the axial direction outer side than the outer cylinder 20A (20B). As shown in FIG. 2B, when the vibration-damping member 2A (2B) is in the no-load state (the state before it is attached to the bracket member 3), the end face of inner cylinder 21A (21B) on the axial direction inner side is further to the axial direction outer side than the end face of the outer cylinder 20A (20B) on the axial direction inner side, and the end faces of the inner cylinders 21A and 21B of the pair of vibration-damping members 2A and 2B on the axial direction inner side are separated from each other. On the other hand, as shown in FIG. 1, when the pair of vibration-damping members 2A and 2B are in the fastened state in which they have been fastened by the fastening member 5 (the state after they are attached to the bracket member 3), the end faces of the inner cylinders 21A and 21B of the pair of vibration-damping members 2A and 2B on the axial direction inner side are butted against each other.

The elastic body 22A (22B) is made from rubber, and is disposed between the outer cylinder 20A (20B) and the inner cylinder 21A (21B). The elastic body 22A (22B) is bonded by vulcanization to each of the inner peripheral face 20a of the outer cylinder 20A (20B), the outer-side face 23a on the axial direction outer side of the flange part 23A (23B), and the outer peripheral face 21a of the inner cylinder 21A (21B). The elastic body 22A (22B) has a tapered shape, its outer diameter gradually decreasing toward the axial direction outer side. The end face 22a on the axial direction inner side of the elastic body 22A (22B) is depressed in a curved shape.

A cut-off part 26A (26B) for giving anisotropy to the vibration-damping member 2A (2B) by reducing rigidity in one direction is formed in the elastic body 22A (22B). The cut-off part 26A (26B) is a recessed part formed by removing a part (a part on the outer peripheral face side) of the elastic body 22A (22B), and extends in the axial direction. The cut-off part 26A (26B) is formed at each of portions which sandwich the inner cylinder 21A (21B) and which are opposite to each other in the radial direction. The cut-off part 26A (26B) is disposed at a position in the short-diameter direction (Y direction) with the shortest radius in the radial directions of the outer cylinder 20A (20B), in the circumferential direction position of the elastic body 22A (22B). That is, the cut-off part 26A (26B) is disposed at a position opposite to the portion in which a radius of the outer cylinder 20A (20B) is the smallest radius R1 in a plan view.

In addition, the cut-off part 26A (26B) may be formed as a hole extending in the up-down direction of the elastic body 22A (22B).

Figure 3:
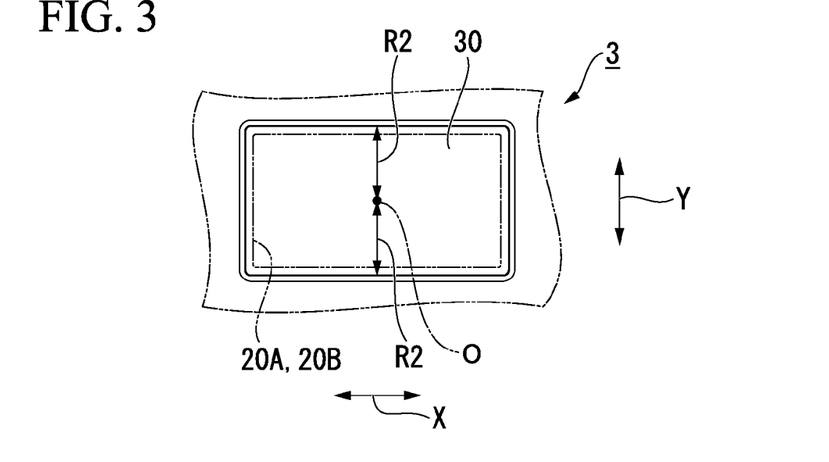
FIG. 3 is a plan view of a bracket member for explanation of the first embodiment of the present invention.

As shown in FIGS. 1 and 3, the bracket member 3 is a thick plate-shaped member fixed to the vehicle body. The bracket member 3 includes a fitting part 30 into which the outer cylinders 20A and 20B of the pair of vibration-damping members 2A and 2B are fitted. The fitting part 30 is an opening that penetrates the bracket member in the up-down direction. The shape (the shape in a plan view) of this fitting part 30 is substantially the same as the external shapes of the outer cylinders 20A and 20B, and the inner peripheral face of the fitting part 30 is formed along the outer peripheral faces of the outer cylinders 20A and 20B. That is, the fitting part 30 is formed in a non-true-circular shape in a plan view having a plurality of radii of different lengths in a horizontal cross-sectional view. The 'radii' described above are the linear distances from the central axis (axis O) of the fitting part 30 to the inner peripheral face of the fitting part 30 in a plan view. That is, the fitting part 30 is formed in a shape in which the distance from its inner peripheral face to the axis O has a plurality of different lengths. In other words, the fitting part 30 is formed in a shape in which the distance from its inner peripheral face to the inner cylinder 21A (21B) has a plurality of different lengths. Also, the fitting part 30 is formed in a rectangular shape in a plan view, being long in the front-rear direction (X direction) and short in the left-right direction (Y direction). That is, the smallest radius of the fitting part 30 is a radius R2 extending in the left-right direction (Y direction). The shape of the fitting part 30 in a plan view has point symmetry with the axis O as the center. The peripheral section of the fitting part 30 of the bracket member 3 is disposed between the upper and lower flange parts 23A and 23B of the pair of vibration-damping members 2A and 2B, and is sandwiched by the upper and lower flange parts 23A and 23B.

As shown in FIG. 1, the pair of sandwiching members 4A and 4B are plate members that sandwich the pair of vibration-damping members 2A and 2B from both sides in the axial direction, and are respectively attached to the end parts of the pair of vibration-damping members 2A and 2B on the axial direction outer side. One sandwiching member 4A in the pair of sandwiching members 4A and 4B is fixed to the engine via an unillustrated engine bracket. Bolt holes 40A and 40B are respectively formed in the pair of sandwiching members 4A and 4B, and are communicated with the insides of the inner cylinders 21A and 21B.

The fastening member 5 connects the pair of sandwiching members 4A and 4B, and includes a bolt 50 and a nut 51. The bolt 50 is inserted into the bolt hole 40A of the sandwiching member 4A from the axial direction outer side of one sandwiching member 4A, passed through inner sides of the top and bottom inner cylinders 21A and 21B and through the bolt hole 40B of the other sandwiching member 4B, and protrudes to the axial direction outer side of the other sandwiching member 4B (downward in FIG. 1). The nut 51 is screwed to the tip of the bolt 50 protruding from the bolt hole 40B of the other sandwiching member 4B.

Subsequently, a method of installing the vibration-damping device 1 will be described.

Firstly, the pair of vibration-damping members 2A and 2B, the bracket member 3, and the pair of sandwiching members 4A and 4B are assembled. The outer cylinder 20A of one vibration-damping member 2A is fitted into the fitting part 30 of the bracket member 3 from above the bracket member 3, and the outer cylinder 20B of the other vibration-damping member 2B is fitted into the fitting part 30 of the bracket member 3 from below the bracket member 3. At this time, since the outer cylinders 20A and 20B and the fitting part 30 are each formed in a non-true-circular shape in a plan view having a plurality of radii of different lengths, the pair of vibration-damping members 2A and 2B and the bracket member 3 are automatically positioned relatively in the circumferential direction. As a result, the cut-off parts 26A and 26B of the elastic body 22A (22B) are disposed at positions in the short-diameter direction (Y direction) with the shortest radius in the radial directions of the outer cylinder 20A (20B).

The sandwiching members 4A and 4B are then arranged above and below the pair of vibration-damping members 2A and 2B, and the pair of sandwiching members 4A and 4B sandwich the pair of vibration-damping members 2A and 2B from above and below. The pair of sandwiching members 4A and 4B are connected by the fastening member 5, which is fastened to apply compressive force to the elastic bodies 22A and 22B, whereby the vibration-damping device 1 is assembled.

More specifically, the bolt 50 is inserted into the bolt hole 40A of one sandwiching member 4A, passed through the pair of inner cylinders 21A and 21B, and the tip of the bolt 50 is protruded from the bolt hole 40B of the other sandwiching member 4B. The nut 51 is screwed to the tip of the protruding bolt 50.

The fastening member 5 is fastened by rotating the bolt 50 or the nut 51. As the fastening member 5 is fastened, the pair of sandwiching members 4A and 4B are both pressed to the axial direction inner side (the direction of moving closer to each other), narrowing the interval between the pair of sandwiching members 4A and 4B, and the pair of vibration-damping members 2A and 2B are pressed from both sides in the axial direction by the pair of sandwiching members 4A and 4B. When the pair of vibration-damping members 2A and 2B are pressed from both sides of the axial direction, the elastic bodies 22A and 22B elastically deform, and the pair of inner cylinders 21A and 21B are pressed toward the axial direction inner side. As a result, the end faces on the axial direction inner side of the pair of inner cylinders 21A and 21B are butted against each other.

When the fastening member 5 is fastened and thus the pair of sandwiching members 4A and 4B are both pressed to the axial direction inner side as described above, the bracket member 3 is sandwiched from above and below between the flange parts 23A and 23B of the pair of outer cylinders 20A and 20B, and the flange parts 23A and 23B are both in close contact with the bracket member 3. The elastic bodies 22A and 22B, which elastically deform when the pair of sandwiching members 4A and 4B were pressed to the axial direction inner side, press the flange parts 23A and 23B radially inward. As a result, the bracket member 3 is sandwiched between the upper and lower flange parts 23A and 23B, and the pair of vibration-damping members 2A and 2B are held by the bracket member 3.

When the pair of sandwiching members 4A and 4B are pressed to the axial direction inner side (the direction of moving closer to each other) by fastening the fastening member 5 as described above, the elastic bodies 22A and 22B are compressed in the axial direction (the up-down direction) by the pair of sandwiching members 4A and 4B, and elastically deform so that they expand radially outward. Therefore, compressive force is applied to the elastic bodies 22A and 22B beforehand.

The vibration-damping device 1 is then fixed to the vehicle body and the engine is mounted on the vibration-damping device 1, whereby the vibration-damping device 1 is installed between the vehicle body and the engine. More specifically, the bracket member 3 is fixed to the vehicle body, and the vibration-damping device 1 is attached to the vehicle body such that the axis O becomes vertical. The engine is fixed via the engine bracket to one (the upper) sandwiching member 4A, and the engine is supported from below. Thus, the engine load is applied to one elastic body 22A via one sandwiching member 4A, whereby the elastic body 22A is further compressed by the engine load and its compression amount increases. On the other hand, the compression amount of the other elastic body 22B decreases.

In this manner, the engine is installed in the vehicle body via the vibration-damping device 1.

According to the vibration-damping device 1 described above, by fitting the outer cylinders 20A and 20B into the fitting part 30 of the bracket member 3, the vibration-damping members 2A and 2B and the bracket member 3 are automatically positioned relatively in the circumferential direction. This makes it easy to reliably position the vibration-damping members 2A and 2B and the bracket member 3 relatively in the circumferential direction. Therefore, the operation of matching the positions of the outer cylinders 20A and 20B in the circumferential direction is simplified, and there is no need to check whether they have been positioned. Since this makes the vibration-damping device 1 less time-consuming to assemble, productivity can be increased.

Since a conventional positioning part can be omitted from the sandwich-type vibration-damping device 1, the manufacturing cost can be kept low. Furthermore, since there is no need to ensure a section for providing a positioning part, it becomes possible to reduce the size of, for example, the flange part 23A (23B) of the outer cylinder 20A (20B). Therefore, the outer cylinder 20A (20B) can be made smaller and the cost thereof can also be reduced.

Since the cut-off parts 26A and 26B are formed in the elastic bodies 22A and 22B, the spring constants of the elastic bodies 22A and 22B decrease in the cut-off part direction (the direction that the cut-off parts are disposed in) in the radial directions of the outer cylinders 20A and 20B, thereby increasing the amounts of deformation of the elastic bodies 22A and 22B in the cut-off part direction. However, the cut-off parts 26A and 26B are disposed at positions in the short-diameter direction with the shortest radius in the radial directions of the outer cylinders 20A and 20B, narrowing the gap between the outer peripheral faces of the inner cylinders 21A and 21B and the inner peripheral faces of the outer cylinders 20A and 20B in the cut-off part direction. This limits the deformations of the elastic bodies 22A and 22B in the cut-off part direction, and suppresses their maximum amounts of deformation in that direction. Therefore, decline in the durability of the elastic bodies 22A and 22B in the cut-off part direction due to forming the cut-off parts 26A and 26B can be suppressed, and the life of the vibration-damping device 1 can be increased.

While the vibration-damping device according to the first embodiment of the present invention has been described above, the invention is not limited to this embodiment and can be modified in without departing from its scope.

Figure 4:
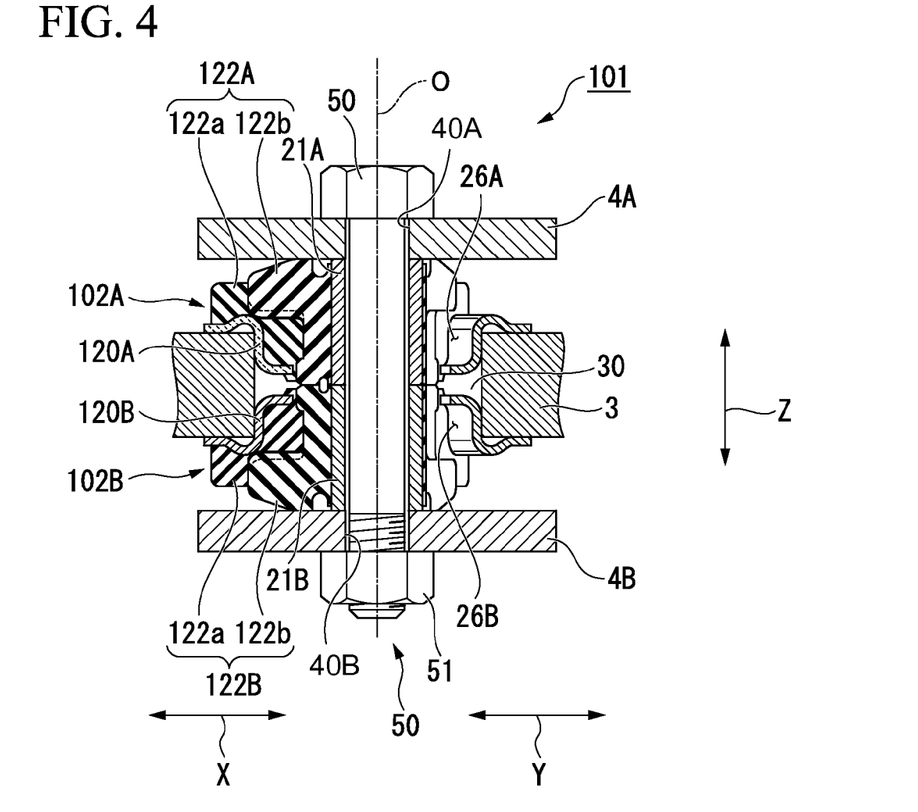
FIG. 4 is a vertical cross-sectional view of a vibration-damping device for explanation of a first modification of the first embodiment of the present invention.

FIG. 4 is a vertical cross-sectional view of a vibration-damping device 101 according to a first modification of the first embodiment.

As shown in FIG. 4, an elastic body 122A (122B) may include a ring-shaped first elastic part 122a bonded by vulcanization to an outer cylinder 120A (120B), and a second elastic part 122b bonded by vulcanization to the inner cylinder 21A (21B) and fitted inside the first elastic part 122a. Thus, a vibration-damping member 102A (102B) may be divided into two sections.

Figure 5:
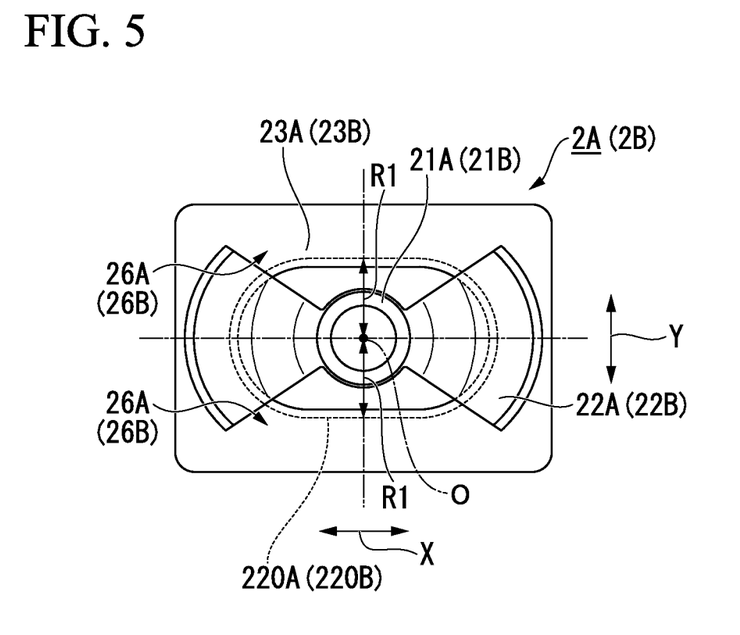
FIG. 5 is a plan view of a vibration-damping member for explanation of a second modification of the first embodiment of the present invention.

While the outer cylinders 20A and 20B (first mounting members) and the fitting part 30 of the bracket member 3 are formed in a rectangular shape in a plan view in the embodiment described above, each shape of the first mounting member and the fitting part in this invention need only be a shape other than a true-circular shape. As for example shown in FIG. 5, an outer cylinder 220A (220B) and a fitting part may have the shape of a circular rectangle in a plan view (the shape in which a pair of opposing straight lines are connected by a pair of opposing circular arcs). The first mounting member and the fitting part may also be formed in the shape of non-rectangular polygons such as squares and triangles, or in an elliptical shape in a plan view.

While the bracket member 3 is connected to the vehicle body and one sandwiching member 4A is connected to the engine via the engine bracket in the embodiment described above, the bracket member 3 may be connected to the engine, and one or both of the upper and lower sandwiching members 4A (4B) may be connected to the vehicle body.

While the sandwiching members 4A and 4B are plate-shaped members in the embodiment described above, they may have shapes other than plates. For example, sandwiching members having the shapes of truncated cones or boxes may be used.

While the flange parts 23A and 23B are provided at the end parts on the axial direction outer side of the outer cylinders 20A and 20B in the embodiment described above, the flange parts 23A and 23B may be provided in an intermediate part of the axial direction of the outer cylinders 20A and 20B.

While the cut-off parts 26A and 26B are formed in the elastic bodies 22A and 22B in the embodiment described above, elastic bodies without the cut-off parts 26A and 26B may also be used.

While the vibration-damping device 1 of the embodiment described above is a sandwich-type vibration-damping device including the pair of vibration-damping members 2A and 2B, the pair of sandwiching members 4A and 4B that sandwich the pair of vibration-damping members 2A and 2B from both sides, and the fastening member 5 that connects the pair of sandwiching members 4A and 4B, it may be configured as a vibration-damping device of a type other than a sandwich-type. For example, it may include only one vibration-damping member, and a first mounting member (outer cylinder) of that vibration-damping member may be fitted into a fitting part of a bracket member. A second mounting member (inner cylinder) may be formed in a shape other than a cylinder.

While the bracket member 3 is connected to the vehicle body (vibration-receiver) and the inner cylinders 21A and 21B are connected via one (the upper) sandwiching member 4A in the pair of sandwiching members 4A and 4B to the engine (vibration-generator) in the embodiment described above, the bracket member 3 may be connected to the engine (vibration-generator) and the inner cylinders 21A and 21B may be connected via the sandwiching member 4A to the vehicle body (vibration-receiver). The inner cylinders 21A and 21B may be connected via the lower sandwiching member 4B in the pair of sandwiching members 4A and 4B to the engine (vibration-generator) or to the vehicle body (vibration-receiver). Alternatively, the inner cylinders 21A and 21B may be connected via both of the pair of sandwiching members 4A and 4B to the engine (vibration-generator) or to the vehicle body (vibration-receiver). The inner cylinders 21A and 21B may be connected to the engine (vibration-generator) or to the vehicle body (vibration-receiver) via another bracket member instead of via the sandwiching members 4A and 4B.

Second Embodiment

Figure 6:
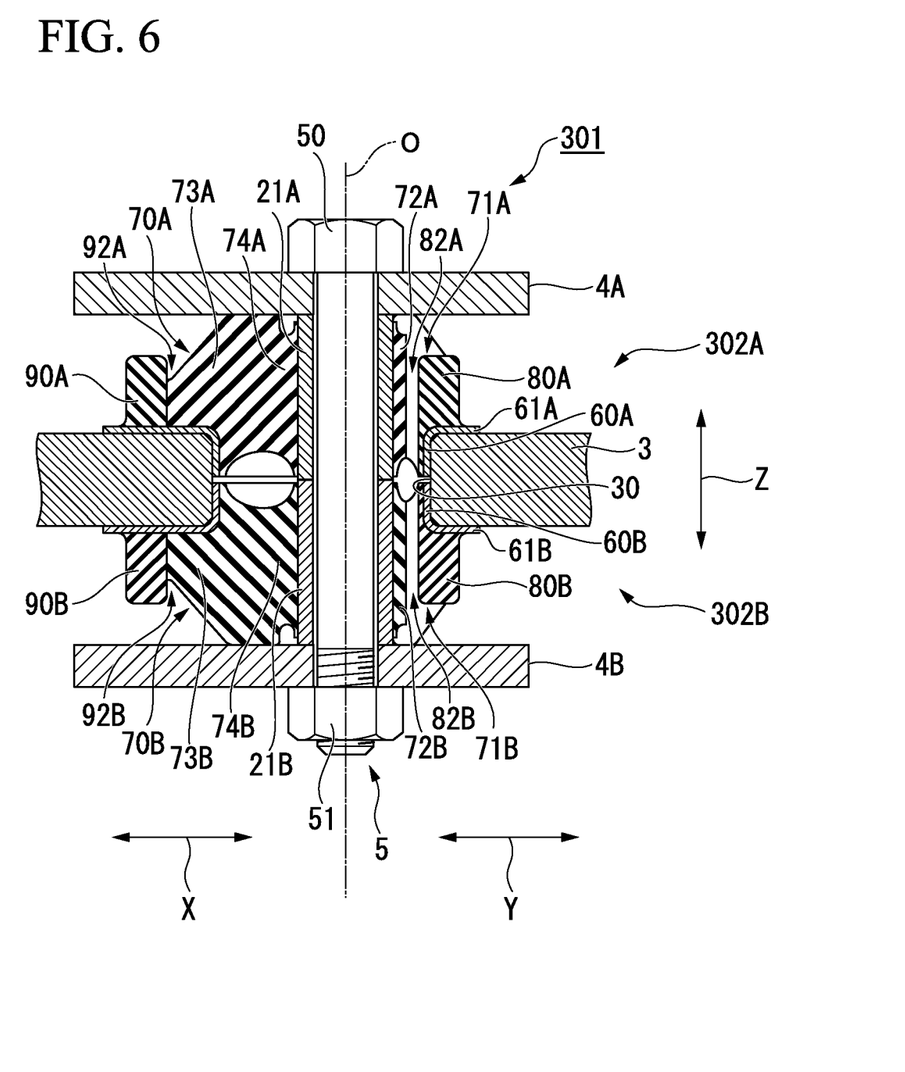
FIG. 6 is a vertical cross-sectional view of a vibration-damping device for explanation of a second embodiment of the present invention.
Figure 7:
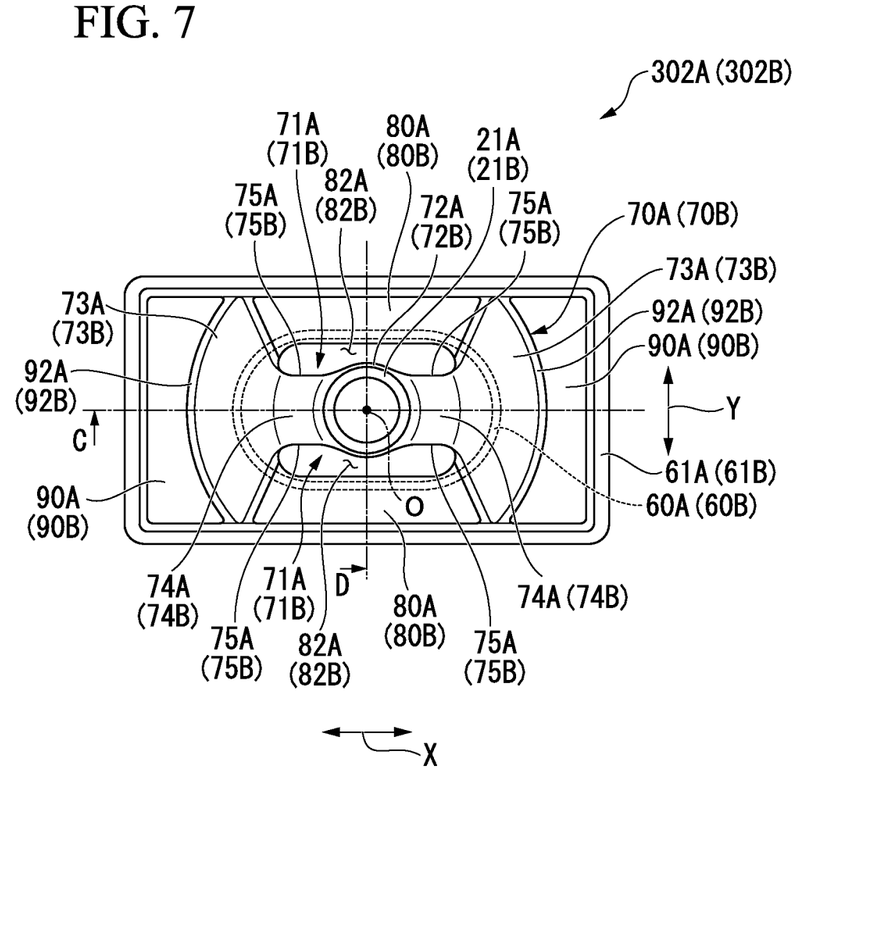
FIG. 7 is a plan view of a vibration-damping member for explanation of the second embodiment of the present invention.

A vibration-damping device 301 according to a second embodiment of the present invention will be described based on FIGS. 6 and 7. In FIGS. 6 and 7, the same constituent elements as those of the first embodiment are designated with the same reference signs, and their descriptions are omitted.

The section on the left side of the axis O in FIG. 6 is a view in the direction of arrow C in FIG. 7, and the section on the right side of the axis O in FIG. 6 is a view in the direction of arrow D in FIG. 7.

As shown in FIG. 6, the vibration-damping device 301 is applied as, for example, an engine mount. The vibration-damping device 301 absorbs and damps vibration input from an unillustrated engine (vibration-generator) mounted on a construction machine, a vehicle, or the like, and prevents the transmission of the vibration to an unillustrated vehicle body (vibration-receiver). The driveshaft of the engine extends in the front-rear direction (X direction), and the engine vibrates mainly in the left-right direction (Y direction) in a plan view.

The vibration-damping device 301 includes a pair of vibration-damping members 302A and 302B having the same shape, a bracket member 3 that holds the pair of vibration-damping members 302A and 302B, a pair of sandwiching members 4A and 4B that sandwich the pair of vibration-damping members 302A and 302B from both sides of the axial direction, and a fastening member 5 that connects the pair of sandwiching members 4A and 4B.

The pair of vibration-damping members 302A and 302B are disposed symmetrically with the perpendicular plane of the axis O as the plane of symmetry. That is, the vibration-damping members 302A and 302B are disposed on the same axis such that the end faces on the axial direction inner sides of outer cylinders 60A and 60B described below (first mounting members) face each other.

As shown in FIGS. 6 and 7, the vibration-damping members 302A and 302B include outer cylinders 60A and 60B connected via the bracket member 3 to the vehicle body, inner cylinders 21A and 21B, elastic bodies 70A and 70B that elastically connect the outer cylinders 60A and 60B and the inner cylinders 21A and 21B, first stopper rubbers 80A and 80B, and second stopper rubbers 90A and 90B.

The outer cylinders 60A and 60B are formed in cylindrical shapes extending in the axial direction, and are provided to respectively surround the outer peripheries of the inner cylinders 21A and 21B. The outer cylinders 60A and 60B are each formed in the shape of a circular rectangle in a plan view (a shape in which a pair of opposing straight lines are connected by a pair of opposing circular arcs), and are each disposed so that the circular rectangle extends in the front-rear direction. That is, the outer cylinders 60A and 60B are each formed in a non-true-circular shape having a plurality of radii of different lengths in a plan view. In other words, the outer cylinders 60A and 60B are each formed in a shape wherein the distance from the outer peripheral face thereof to the axis O has a plurality of different lengths.

Flange parts 61A and 61B are connected to the end parts on the axial direction outer sides of the outer cylinders 60A and 60B (the end parts on the sides of the sandwiching members 4A and 4B), and protrude radially outward. The flange parts 61A and 61B are disposed along the whole peripheries of the outer cylinders 60A and 60B, and are formed substantially rectangular in a plan view.

The outer cylinders 60A and 60B each have a shape wherein a pair of flat wall faces extending in the front-rear direction are smoothly connected by a pair of curved wall faces extending in a circular arc in a plan view. Thus the outer cylinders 60A and 60B do not have any sharply bending points in a plan view, making them easy to process. Therefore, the productivity of the outer cylinders 60A and 60B can be increased and the manufacturing cost can be reduced.

Elastic bodies 70A and 70B are made from rubber, and are disposed between the outer cylinders 60A and 60B and the inner cylinders 21A and 21B. The elastic bodies 70A and 70B are bonded by vulcanization to the inner peripheral faces of the outer cylinders 60A and 60B, the outer-side faces on the axial direction outer side of the flange parts 61A and 61B, and the outer peripheral faces of the inner cylinders 21A and 21B. The elastic bodies 70A and 70B are formed such that their outer diameters gradually decrease toward the axial direction outer side.

Cut-off parts 71A and 71B for giving anisotropy to the vibration-damping members 302A and 302B by reducing the rigidity in one direction are formed in the elastic bodies 70A and 70B. The cut-off parts 71A and 71B are recessed parts formed by removing parts (parts on the sides of the outer peripheral faces) of the elastic bodies 70A and 70B, and extend in the axial direction. The cut-off part 71A or 71B is formed at each of portions which sandwich the inner cylinder 21A or 21B and which are opposite to each other in the radial direction. The cut-off parts 71A or 71B are arranged in the left-right direction. Therefore, the rigidity of the elastic bodies 70A and 70B in the left-right direction are less than that in the front-rear direction.

The elastic bodies 70A and 70B include center parts 72A and 72B provided around the outer peripheries of the inner cylinders 21A and 21B, end parts 73A and 73B provided at each of both sides in the front-rear direction with the center parts 72A and 72B as the centers, and connection parts 74A and 74B that connect the center parts 72A and 72B to the end parts 73A and 73B.

In a plan view, the end parts 73A and 73B have shapes that gradually become wider toward radially outward. The end parts 73A and 73B are bonded by vulcanization to the outer cylinders 60A and 60B and the flange parts 61A and 61B.

The widths of the connection parts 74A and 74B in the left-right direction are narrower than those of the center parts 72A and 72B in the left-right direction. Consequently, the elastic bodies 70A and 70B have shapes that are constricted at the sections of the connection parts 74A and 74B in a plan view. Connection-part side faces 75A or 75B are side faces on the left and right sides of the connection parts 74A or 74B, and are curved faces depressed with respect to the outer side in a plan view. The connection-part side faces 75A or 75B smoothly connect the side faces of the center part 72A or 72B to the side faces of the end parts 73A or 73B.

The first stopper rubber 80A or 80B is disposed inside each of the cut-off parts 71A or 71B of the elastic body 70A or 70B. Thus the first stopper rubbers 80A or 80B are provided in the left-right direction. The first stopper rubbers 80A and 80B are formed using the same rubber as the elastic bodies 70A and 70B, and are bonded by vulcanization to the inner peripheral faces of the outer cylinders 60A and 60B and the outer-side faces on the axial direction outer sides of the flange parts 61A and 61B. The first stopper rubbers 80A and 80B may be formed using a rubber having a higher hardness than that used in forming the elastic bodies 70A and 70B.

The first stopper rubbers 80A and 80B are provided in contact with the side faces of the end parts 73A and 73B on the elastic bodies 70A and 70B. Hole parts 82A and 82B are formed between the first stopper rubbers 80A and 80B, and the center parts 72A and 72B and the connection parts 74A and 74B of the elastic bodies 70A and 70B. The hole parts 82A and 82B are formed so as to penetrate in the up-down direction (Z direction).

The first stopper rubbers 80A and 80B are provided so as to protrude from the flange parts 61A and 61B toward the sandwiching members 4A and 4B. In the axial direction, gaps are formed between the first stopper rubbers 80A and 80B and the sandwiching members 4A and 4B. The first stopper rubbers 80A and 80B extend in the front-rear direction.

The second stopper rubber 90A or 90B is disposed at each of the radial-direction outer sides of the end parts 73A or 73B of the elastic body 70A or 70B, and provided in contact with each of the side faces of the end parts 73A or 73B. That is, the second stopper rubbers 90A or 90B are in the front-rear direction. The second stopper rubbers 90A and 90B are formed using the same rubber as the elastic bodies 70A and 70B, and are bonded by vulcanization to the outer-side faces on the axial direction outer side of the flange parts 61A and 61B. The second stopper rubbers 90A and 90B may be formed using a rubber having a higher hardness than that used in forming the elastic bodies 70A and 70B.

The second stopper rubbers 90A and 90B are provided so as to protrude from the flange parts 61A and 61B toward the sandwiching members 4A and 4B. In the axial direction, gaps are formed between the second stopper rubbers 90A and 90B and the sandwiching members 4A and 4B. The gaps between the second stopper rubbers 90A and 90B and the sandwiching members 4A and 4B are substantially the same size as the gaps between the first stopper rubbers 80A and 80B and the sandwiching members 4A and 4B. The second stopper rubbers 90A and 90B extend in the left-right direction. Grooves 92A and 92B are formed between the second stopper rubbers 90A and 90B and the end parts 73A and 73B, and face the sandwiching members 4A and 4B. The grooves 92A and 92B may not be formed.

Subsequently, operation of the vibration-damping device 301 of this embodiment will be described.

As described above, if the rigidity of the vibration-damping members 302A and 302B decreases, their vibration-damping performance increases. Since the cut-off parts 71A and 71B are formed in the elastic bodies 70A and 70B, the rigidity of the vibration-damping members 302A and 302B in the left-right direction in which the cut-off parts 71A and 71B are arranged is less than that in the front-rear direction. Consequently, the vibration-damping performance of the vibration-damping members 302A and 302B in the left-right direction can be made greater than that in the front-rear direction.

In this embodiment, since the driveshaft of the engine extends in the front-rear direction, the vibration that the engine inputs to the vibration-damping device 301 is mainly vibration in the left-right direction. Therefore, the vibration-damping device 301 including the vibration-damping members 302A and 302B can efficiently absorb and damp the vibration input from the engine.

The connection-part side faces 75A and 75B in the connection parts 74A and 74B of the elastic bodies 70A and 70B are curved faces depressed with respect to the outer side, and smoothly connect the side faces of the center parts 72A and 72B to the side faces of the end parts 73A and 73B. Therefore, when vibration is input to the vibration-damping device 301 and the elastic bodies 70A and 70B elastically deform, local stress can be prevented from concentrating in and around the connection parts 74A and 74B. This makes it possible to increase the durability of the elastic bodies 70A and 70B, and increase the life of the vibration-damping device 301.

When large vibration (e.g. vibration in the up-down direction) has been input to the vibration-damping device 301, the elastic bodies 70A and 70B deform greatly, and the sandwiching members 4A and 4B abut against the first stopper rubbers 80A and 80B and the second stopper rubbers 90A and 90B. Thereafter, the first stopper rubbers 80A and 80B and the second stopper rubbers 90A and 90B deform together with the elastic bodies 70A and 70B. This increases the spring constants of the vibration-damping members 302A and 302B after the sandwiching members 4A and 4B have abutted against the first stopper rubbers 80A and 80B and the second stopper rubbers 90A and 90B. Therefore, great deformation of the elastic bodies 70A and 70B can be limited, the durability of the elastic bodies 70A and 70B can be increased, and the life of the vibration-damping device 301 can be increased. Furthermore, since the deformation of the elastic bodies 70A and 70B is limited, the engine attached to the sandwiching member 4A can be prevented from interfering with other members in the vehicle body at the time when vibration is input.

Since the hole parts 82A and 82B are formed between the elastic bodies 70A and 70B and the first stopper rubbers 80A and 80B, the rigidity of the vibration-damping members 302A and 302B is locally reduced. It is therefore possible to reduce the spring constants of the vibration-damping members 302A and 302B at the time when they start to deform after vibration is input, and thus to maintain the high vibration-damping performance of the vibration-damping members 302A and 302B in regard to small vibration.

Also, the grooves 92A and 92B are formed between the elastic bodies 70A and 70B and the second stopper rubbers 90A and 90B. The grooves 92A and 92B become spaces in which the elastic bodies 70A and 70B expand radially outward when the elastic bodies 70A and 70B are compressed. This prevents the elastic bodies 70A and 70B from being compressed excessively, and increases their durability.

The first stopper rubbers 80A and 80B and the second stopper rubbers 90A and 90B may be formed using a rubber having a higher hardness than that used in forming the elastic bodies 70A and 70B. This further increases the spring constants of the vibration-damping members 302A and 302B when large vibration is input. Therefore, the durability of the vibration-damping members 302A and 302B can be further increased.

The vibration-damping device according to the present invention is not limited to the engine mount of a vehicle, and can be used for other purposes. For example, the vibration-damping device according to the present invention can be used as a mount for a power generator mounted on a construction machine, or as a mount for a machine installed in a factory or the like.

In addition, the constituent elements in the embodiments described above can be replaced with conventionally known constituent elements without departing from the scope of the present invention, and the embodiments and modifications described above can be combined.

INDUSTRIAL APPLICABILITY

According to the present invention, it is possible to provide a vibration-damping device that can make it easy to reliably position a vibration-damping member and a bracket member relatively in the circumferential direction, and can increase productivity.

DESCRIPTION OF REFERENCE SIGNS 1, 101, 301 Vibration-damping device
2A, 2B, 102A, 102B, 302A, 302B Vibration-damping member
3 Bracket member
4A, 4B Sandwiching member
5 Fastening member
20A, 20B, 60A, 60B, 120A, 120B, 220A, 220B Outer cylinder (first mounting member)
21A, 21B Inner cylinder (second mounting member)
22A, 22B, 70A, 70B, 122A, 122B Elastic body
23A, 23B, 61A, 61B Flange part
30 Fitting part

The invention claimed is:

1. A vibration-damping device comprising:
   a bracket member connected to one of a vibration-generator and a vibration-receiver; and
   a vibration-damping member including: a cylindrical first mounting member fitted inside a fitting part provided in the bracket member and connected to the one of the vibration-generator and the vibration-receiver via the bracket member, a second mounting member connected to the other of the vibration generator and the vibration receiver, and an elastic body that elastically connects the first mounting member and the second mounting member, wherein
   the first mounting member and the fitting part are each formed in a shape having a plurality of radii of different lengths in a plan view such that the vibration-damping member and the bracket member are positioned in the circumferential direction in response to the first mounting member being fitted inside the fitting part of the bracket member, and
   a cut-out part is formed in the elastic body and is disposed at a position in a short-diameter direction with the shortest radius in radial directions of the first mounting member.

2. The vibration-damping device according to claim 1, wherein
   a pair of vibration-damping members are disposed such that end faces of first mounting members in an axial direction thereof face each other, and second mounting members are formed in cylindrical shapes;
   a pair of sandwiching members are provided to sandwich the pair of vibration-damping members from both sides in an axial direction thereof, and a fastening member is provided to be inserted inside the second mounting members and to connect the pair of sandwiching members;
   each first mounting member of the pair of vibration-damping members includes a flange part that protrudes radially outward;
   the bracket member is disposed between a pair of flange parts; and
   by fastening the fastening member and thereby pressing the pair of sandwiching members in a direction closer to each other, the bracket member is sandwiched between the pair of flange parts and the pair of vibration-damping members are held in the bracket member, and elastic bodies are compressed beforehand by the pair of sandwiching members.

* * * * *